Figure 6:
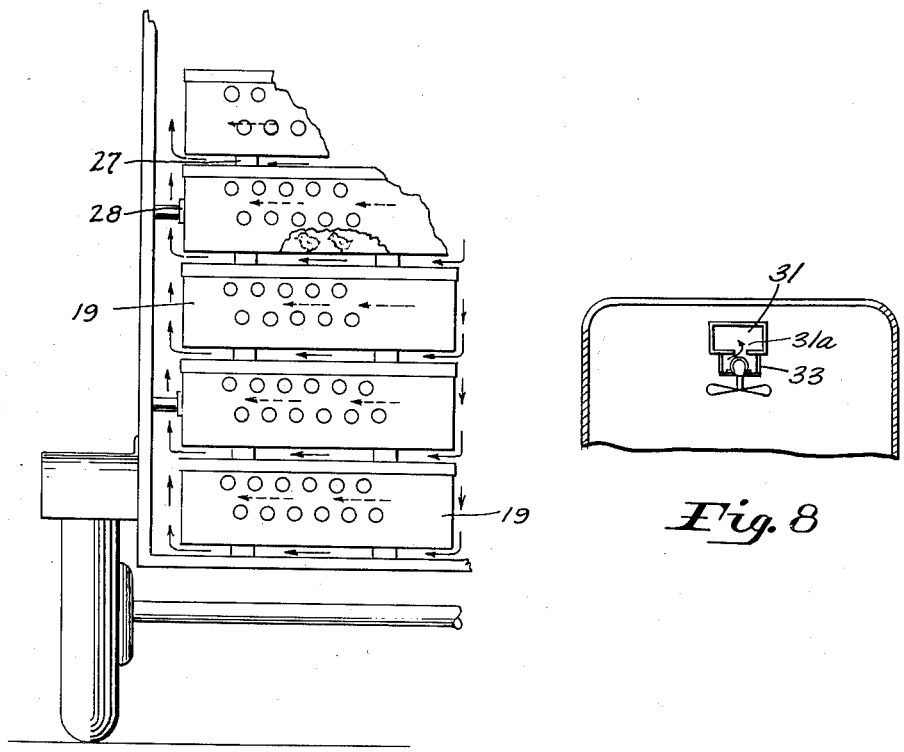

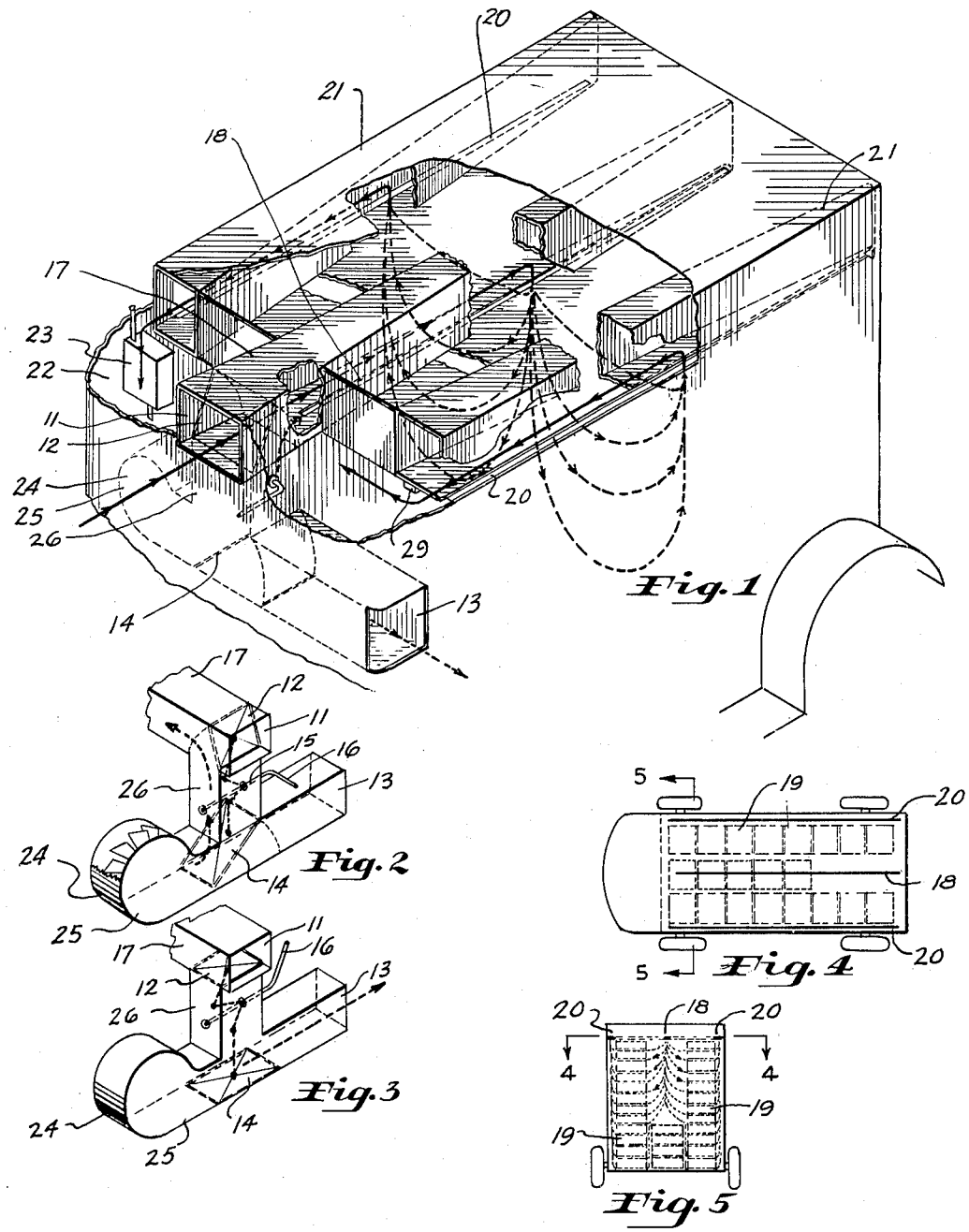

Feb. 14, 1956   A. G. LUNN, JR., ET AL   2,734,444
CONVEYANCES FOR THE TRANSPORATION OF BABY CHICKS
Filed June 29, 1951   3 Sheets--Sheet 2

INVENTORS
Alfred G. Lunn, Jr.
BY Harry L. Armstrong
Joseph Zallen
ATTORNEY

Feb. 14, 1956   A. G. LUNN, JR., ET AL   2,734,444
CONVEYANCES FOR THE TRANSPORATION OF BABY CHICKS
Filed June 29, 1951   3 Sheets-Sheet 3
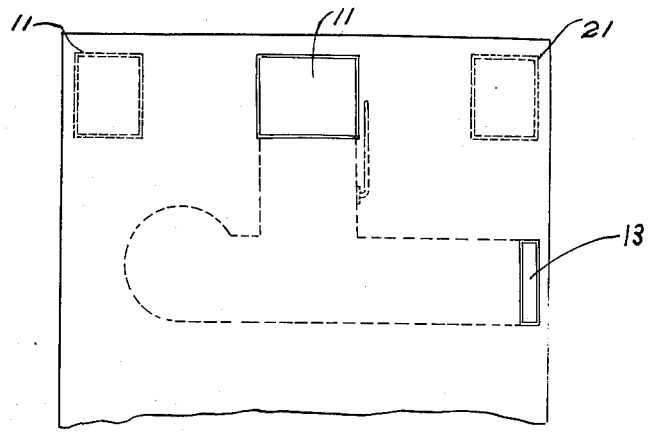
Fig. 1A
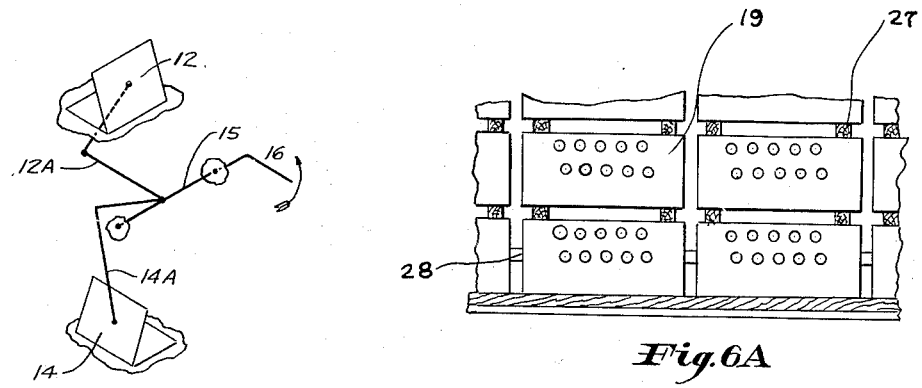
Fig. 2A
Fig. 6A
INVENTORS
Alfred G. Lunn, Jr.
Harry L. Armstrong
BY Joseph Zaller
ATTORNEY

United States Patent Office 2,734,444
Patented Feb. 14, 1956

2,734,444

CONVEYANCES FOR THE TRANSPORTATION OF BABY CHICKS

Alfred G. Lunn, Jr., Halifax, and Harry L. Armstrong, Middleboro, Mass.; said Armstrong assignor to Dorothy E. Lunn, Halifax, Mass.

Application June 29, 1951, Serial No. 234,334

2 Claims. (Cl. 98—10)

This invention deals with the transportation of baby poultry and, more particularly, with the transportation of newly-hatched chicks from the commercial hatchery to the farmer who broods and raises the chicks.

It is estimated by the U. S. Department of Agriculture that more than 85% of all chickens raised in farm flocks come from commercial hatcheries. These hatcheries specialize in incubating and hatching the eggs and then shipping the newly-born chicks to farmers or others who raise the chicks, and then make their profit from the sale of eggs or poultry. It is estimated that about two billion chicks a year are produced by these commercial hatcheries located all over the country. However, the markets for an individual hatchery are at present limited to small geographic areas because of the lack of a satisfactory and economical system for transportation of baby chicks.

In shipment of chicks, various sizes of ventilated crates are used which normally hold about a hundred chicks each. A typical crate is divided by partitions into four compartments, with perforations in the partitions and walls and excelsior mats on the bottom. Thus, about 25 chicks will be stored in each compartment. If the crates are widely separated from one another, and there is the correct amount of ventilation and heat, the baby chicks can survive for 72 hours without additional food. However, if such crates are piled close to one another, as efficient transport seems to dictate, the chicks will have a high mortality rate within a few hours. Thus, when a hatchery loads crates of chicks on an ordinary truck, the truck must reach its destination within a few hours to avoid this high chick mortality rate. Spreading out of crates can relieve the problem but shipment then becomes inefficient and expensive. In fact, the only way known at present to transport crates of chicks with safety more than a hundred or so miles, is to place a few crates in a relatively empty box car, van, aeroplane, or the equivalent.

Attempts have been made to provide trucks and trailers with suitable artificial ventilation. Trucks now in use for short hauls from hatcheries are equipped with louvres and fan heaters. Vans with exhaust fans and internal blower heaters have also been used, according to the standard teaching of the art of ventilation. To our knowledge, however, none of these vans provide safe conditions for baby chicks for more than a few hours under average conditions.

One object of this invention is to provide a method for transporting baby chicks over long distances in all seasons and weather and through varying types of climate in an efficient and economical manner. Another object of this invention is to provide a specially designed van for transportation of chicks according to the method described. A further object of this invention is to provide a vehicle so disposed and arranged that an extremely large load of baby chicks may be kept in the proper conditions of heat and carbon dioxide content until they arrive at their destination.

We have discovered that controlled and continuous air flow is necessary for successful design of transportation equipment for baby chicks. We have found that a chick van capable of maintaining the chicks in healthy condition for a long period of time must provide sufficient uniform recirculation of air around and through the chick crates in order to maintain proper temperature, usually about 100° Fahrenheit, and to remove carbon dioxide from the crates. Further, we have found that sufficient exchange of the recirculated air with fresh air is important. We have found, for example, that one of the most efficient ways of obtaining safe conditions in a confined space is to arrange two tiers of chick crates with a substantially open space in the middle and then have the continuous currents of air spread from the top of the ceiling downward, sideward, around, between, and through the perforated crates, and finally up the side walls where these currents of air rejoin the incoming streams. By use of horizontal bars, enough space between crates and walls is created to give sufficient vertical air flow. We have further found, for example, that with such an arrangement, 2,000 cubic feet per minute fresh air exchange and 4,000 cubic feet per minute recirculation in a van having a volume of 1,500 cubic feet is sufficient to keep 50,000 chicks alive for a period of approximately 72 hours during transit. This represents recirculation of at least twice a minute and air exchange of at least one a minute. With smaller loads, these requirements may be lessened somewhat.

In one embodiment, described below, recirculating fans are spaced at equal distances on the inside ceiling of the van in such manner that the air flow follows the preferred path of down, over and up through the chick crates. An exhaust in the rear is used to exchange the air when required while duct work allows fresh air to enter from the ceiling. In a preferred embodiment described below, both the exhaust and fresh-air intake openings are located at the front, with damper controls for regulating fresh air exchange. Recirculation is accomplished by use of a central longitudinal ceiling duct which acts as the inlet, and side ducts which take up the air. This latter embodiment has the economical advantage of having a single motor which takes care of intake, exhaust and recirculation.

It is our belief that the operability of this invention, as against inoperability of present day chick vans, is partly due to the ability of vans, constructed according to this invention, to maintain a low carbon dioxide content in the crates. We have found that baby chicks are very sensitive to local excesses of carbon dioxide. The ease of creating such a carbon dioxide excess locally in a van is best understood when we note that the air consumption of 100 chicks, weighing 8½ pounds, is approximately one-third that of an average human being, since chicks give out six times as much carbon dioxide as human beings. Therefore, a van load of 50,000 chicks would be equivalent to approximately 150 adult human beings. Such an environment, obviously, would be unbearable for humans more than a few hours in such a van with the ordinary type of exhaust ventilation.

Figure 8:
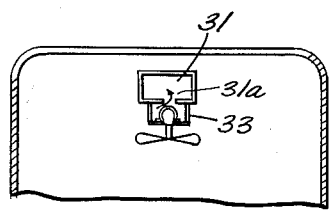
Figure 7:
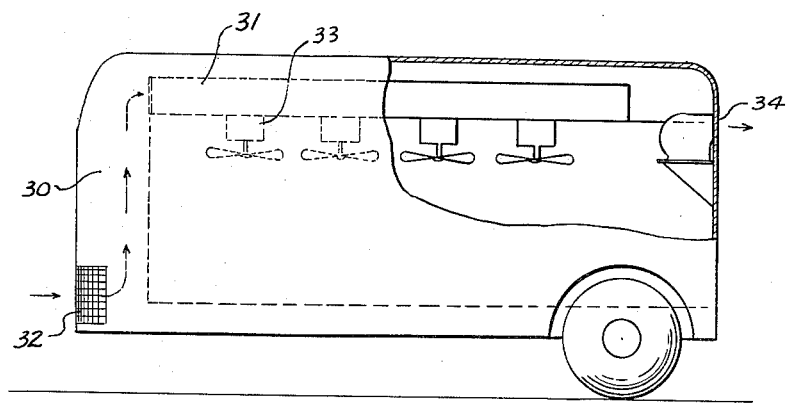

This invention is best understood by a detailed description of a preferred embodiment showing all the features and advantages as heretofore described. Figure 1 illustrates a break away perspective and schematic view of the van body showing the arrangement of the tapering duct work and flow of air. Figure 1A is a partial view of the front of the van body. Figure 2 shows dampers arranged to allow no air exchange but total recirculation. Figure 2A is a cut away portion of Figure 2, illustrating the structure of the dampers and hinged rods. Figure 3 shows the operation of the dampers wherein old air is exhausted and fresh air is taken in. Figure 4 is a horizontal cross-section across the top portion of the van illustrating, schematically, the arrangement of the slots in the duct work. Figure 5 is a vertical cross-section of the van showing the schematical arrangement of the chick crates and flow of air in the van. Figure 6 shows, in vertical cross-section, the detail of the air flow through the chick crates. Figure 6A illustrates in partial cutaway, a side view spacing of the chick crates. Figure 7 illustrates in a schematic and cutaway side view, another embodiment utilizing a front intake vent, ceiling inlet duct, ceiling recirculation fans and rear exhaust fan. Figure 8 is a partial vertical transverse section along line 10—10 of Figure 7 showing the inlet duct construction.

Referring now to Figures 1 and 1A, we have on the front end of the van, a fresh air inlet 11, equipped with a fresh air damper 12. Somewhat lower, and to the side of this inlet, is an exhaust 13, with an exhaust damper 14.

Referring to Figures 2, 2A and 3, the fresh air damper 12 is firmly connected by a hinged rod 12A to a rotatable rod 15, mounted in the central duct work stack 26 and having an externally actuatable handle 16. The damper 14 is similarly connected to the rotatable rod 15, by a hinged rod 14A.

When, as illustrated in Figure 3, the fresh air damper 12 is open, fresh air comes in through the fresh air inlet and proceeds directly down a duct 17, which feeds air to the body of the truck proper. This duct 17, referred to as the inlet duct, a positive pressure duct, tapers toward the rear and has a slot 18, going the median length of the truck body. This tapering allows fairly uniform efflux of the air over the entire length of the slot.

With this embodiment it has been found, as shown in Figure 5, that the air flows down and then towards the sides, diffusing between and through the chick crates 19, and then gather up the sides of the van to the inlet slots 20, which are at about the same height as the inlet slot, 18, thence into the tapering negative pressure ducts 21, which allow the air to be conveyed to a chamber 22. Within this chamber is a heating element 23, and an inlet slotted grill opening 24, of a motor driven air blower 25. This blower 25 blows the air out of the chamber 22, either into the exhaust 13 or up the central duct work stack 26 or partially to both. If the damper 14 is closed the air will all go back up the central stack 26 where since the damper 12 is also closed when the damper 14 is closed, the blower is effecting the recirculation of the air from the chamber to the central inlet duct 17. When the damper 14 is completely opened, the damper 12 now blocks the stack 26 but opens the inlet port 11. In this case, the blower exhausts all the air it draws from the chamber and at the same time by virtue of the entire van being a closed system is indirectly drawing the air from inlet 11 into duct 17. Manipulation of the handle 16 allows the operator to select either complete recirculation as in Figures 2 and 2A, complete air exchange as illustrated in Figure 3 or any intermediate combination. In any event, since the air blower is always pulling a constant flow from the outlet duct, the air flow in the chick crate compartment is constant and uniform regardless of the damper position.

In construction, the ductwork is formed by use of a false ceiling 27A between the top of the van proper and the body interior. The slots mentioned are made in the false ceiling and partitions in the space between the false ceiling and the roof form the vertical sides of the ducts. The blower 25 used in this model has a capacity of about 4,000 cubic feet a minute and can be driven either by electricity from power of the prime mover of the van, or by a separate gasoline engine housed directly below the blower compartment, or by other means.

As illustrated in Figure 5, the crates are best arranged by stacking in two rows along the sides of the van, a lower row in the middle being optional. In a typical large-size van, this would enable the loading of up to 500 crates of the standard chick type, containing about 100 chicks apiece.

In Figure 6, which is a partial vertical cutaway illustrating the detail of arrangement of chick crates and ventilation, the mounting blocks 27 are shown separating the chick crates 19. Horizontal bars 28 serve as a means of latching and also allow sufficient space for the air currents to flow up to the side outlet ducts 21.

In Figure 6A the arrangement of the mounting blocks 27 and the horizontal bars 28 are further illustrated in side view.

With this embodiment, the operation in cold and mild weather is relatively simple. The boxes of chicks are loaded as indicated and thermostat, 29, controlling the required temperature by means of the heater, is put into operation. The blower is started and the fresh-air exhaust dampers are moved by the control handle so as to allow the proper amount of desired fresh air and exhaust to maintain an appropriate temperature and carbon dioxide content. If the loads are uneven or crates are of odd sizes, additional individually controlled dampers may be spaced in the inlet duct 17 to get uniform dispersion for such uneven loads.

In hot weather, operation is similar except that requirement for the heater is much less and the fresh air exchange is usually at a maximum. If this amount of fresh air exchange is not sufficient, the sides of the van can be arranged so as to open up, thus increasing air exchange. However, this is rarely needed. This embodiment is thus successfully operated with a minimum of attention in both heat and cold. Models made according to this description have been carrying van loads of viable chicks without any loss from Massachusetts to Georgia.

If the van is to be operated in tropical areas, where air temperatures are likely to very often be in excess of 100° Fahrenheit, it may be desirable to install refrigerated coils in the air-mixing chamber, 22. Thus, the thermostat, 29, could then call on the coils if the air exchange were not sufficient to maintain a proper temperature.

One modication of this embodiment, in addition to the series of dampers in the inlet duct, 17, is to use two edge slots rather than one median in the inlet duct, 17, and a plurality of slots in the outlet duct, 21.

Various other embodiments within the principle of this invention have been devised. One embodiment makes use of an air-mixing chamber instead of the stack arrangement in Figures 2 and 3, and uses recirculating fans. This is illustrated in Figures 7, 8, 9 and 10 where the fresh air comes into a chamber, 30, and loses its turbulence before going into the inlet duct, 31 and then out through slot 31A. It has the advantage in that the flow does not depend on the speed of the vehicle, although the grill work, 32, to the outside, is always open. Recirculation in this embodiment is provided by ceiling recirculating fans, 33. Removal of air to outside is done by a fan-driven rear exhaust, 34.

Other modifications within the principles of this invention may readily suggest themselves, and are to be considered as covered by this disclosure. Further, such vans are suitable for other new-born poultry having similar physiology as that of chicks. It is further obvious that this invention is not limited to motor vans and trailers but, is readily adaptable to railroad box cars, aeroplane freight compartments, vessels and other means of transportation.

We claim:

1. In a conveyance for the safe transportation of baby chicks: a storage chamber having a blower compartment extending across the front end of said chamber; an air blower mounted in the lower portion of said compartment, said blower having an air inlet communicating with said compartment; a supply conduit mounted adjacent the center of the ceiling of said chamber and extending longitudinally of said chamber; return conduits mounted at the outer edges of the ceiling and extending in parallel spaced relation with respect to said supply conduit, said conduits being provided with openings communicating with said chamber; a first duct extending from the outlet of said blower, along the lower portion of said compartment and through the side wall of said conveyance; a second duct extending vertically in said compartment and connected to said first duct near the outlet of said blower, the upper end of said second duct being connected to said supply conduit; a third duct connected at one end to the upper end of said second duct and having its other end extending through the front wall of said conveyance, the forward ends of said return conduits communicating with the upper portion of said blower compartment for conducting the return air to the inlet of said blower; and dampers mounted at the junction of said first and second duct and at the junction of said second and third duct, whereby fresh air can enter said third duct, thence into said supply conduit and exhaust air from the return conduits can be discharged through said first duct to the exterior of said conveyance when the dampers are in one extreme position, and all the air can be in constant recirculation when the dampers are in the other extreme position.

2. In a conveyance for the safe transportation of baby chicks: a storage chamber having a blower compartment extending across the front end of said chamber; an air blower mounted in the lower portion of said compartment, said blower having an air inlet communicating with said compartment; a supply conduit mounted adjacent the center of the ceiling of said chamber and extending longitudinally of said chamber; return conduits mounted at the outer edges of the ceiling and extending in parallel spaced relation with respect to said supply conduit; a first duct extending from the outlet of said blower, along the lower portion of said compartment and through the side wall of said conveyance; a second duct extending vertically in said compartment and connected to said first duct near the outlet of said blower, the upper end of said second duct being connected to said supply conduit; a third duct connected at one end to the upper end of said second duct and having its other end extending through the front wall of said conveyance, the forward ends of said return conduits communicating with the upper portion of said blower compartment for conducting the return air to the inlet of said blower; and dampers mounted at the junction of said first and second duct and at the junction of said second and third duct, whereby fresh air can enter said third duct, thence into said supply conduit and exhaust air from the return conduits can be discharged through said first duct to the exterior of said conveyance when the dampers are in one extreme position, and all the air can be in constant recirculation when the dampers are in the other extreme position; said dampers being interlinked and having a single regulation control means, intermediate positions of said control means allowing a constant flow of proportionate amounts of entering fresh air and recirculated air within said chamber, said supply and return conduits being tapered in cross section from the front end of said chamber, each of said conduits being provided with a longitudinal slot.

References Cited in the file of this patent

UNITED STATES PATENTS

| Number | Name | Date |
|---|---|---|
| 815,093 | Keeney | Mar. 13, 1906 |
| 1,138,470 | Hackney | May 4, 1915 |
| 1,693,049 | Pierce | Nov. 27, 1928 |
| 2,033,069 | Hagen et al. | Mar. 3, 1936 |
| 2,150,449 | Madden | Mar. 14, 1939 |
| 2,251,617 | Pirnie | Aug. 5, 1941 |
| 2,310,222 | Deverall | Feb. 9, 1943 |
| 2,340,252 | Palmer | Jan. 25, 1944 |
| 2,360,686 | Johnson | Oct. 17, 1944 |
| 2,364,722 | Kazantzeff | Dec. 12, 1944 |
| 2,370,886 | Solberg | Mar. 6, 1945 |
| 2,439,487 | Reilly | Apr. 13, 1948 |
| 2,479,030 | Taggart | Aug. 16, 1949 |
| 2,505,973 | Julian | May 2, 1950 |
| 2,507,057 | Solberg | May 9, 1950 |
| 2,610,567 | Davis | Sept. 16, 1952 |